(12) United States Patent
Livingston

(10) Patent No.: US 8,869,734 B2
(45) Date of Patent: Oct. 28, 2014

(54) RELIABLE DEER WHISTLE

(76) Inventor: Michael Kent Livingston, Pine, CO (US)

(*) Notice: Subject to any disclaimer, the term of this patent is extended or adjusted under 35 U.S.C. 154(b) by 284 days.

(21) Appl. No.: 13/353,918

(22) Filed: Jan. 19, 2012

(65) Prior Publication Data

US 2013/0186322 A1 Jul. 25, 2013

(51) Int. Cl.
*G10K 5/00* (2006.01)
*G10K 5/02* (2006.01)

(52) U.S. Cl.
USPC ............................................. 116/137 R

(58) Field of Classification Search
CPC ................................. G10K 5/00; G10K 5/02
USPC ........... 116/137 R, 142 FP, 142 FV; 446/204, 446/205, 206, 216; D10/119.1, 119.3; D11/411
See application file for complete search history.

(56) References Cited

U.S. PATENT DOCUMENTS

| | | | | |
|---|---|---|---|---|
| 3,103,911 A | * | 9/1963 | Tappan et al. | 116/137 R |
| 3,156,212 A | * | 11/1964 | Buell, Jr. | 116/137 A |
| 4,150,637 A | * | 4/1979 | Penick | 116/58 R |
| 4,359,961 A | * | 11/1982 | Seron | 116/137 R |
| 4,437,428 A | * | 3/1984 | Hoffelner | 116/137 R |
| 4,821,670 A | * | 4/1989 | Foxcroft et al. | 116/137 R |
| 4,903,630 A | * | 2/1990 | Rezmer | 116/22 A |
| 5,057,832 A | * | 10/1991 | England | 340/966 |
| 5,341,762 A | * | 8/1994 | Petersen | 116/137 A |
| 5,418,518 A | * | 5/1995 | Schenken et al. | 340/384.1 |
| D390,147 S | * | 2/1998 | Hartmann et al. | D10/119.1 |
| 5,782,575 A | * | 7/1998 | Vincent et al. | 403/270 |
| 6,056,411 A | * | 5/2000 | Blevins | 359/838 |
| 6,109,202 A | * | 8/2000 | Topman et al. | 116/137 R |
| 6,698,377 B1 | * | 3/2004 | Topman et al. | 116/137 R |
| 6,803,239 B2 | * | 10/2004 | Sullivan et al. | 436/518 |
| 6,905,000 B1 | * | 6/2005 | Viveros | 181/129 |
| 7,370,601 B1 | * | 5/2008 | Williams | 116/22 A |
| 7,743,724 B1 | * | 6/2010 | Broser | 116/137 R |

FOREIGN PATENT DOCUMENTS

JP  2006220632 A  *  8/2006  .............. G01P 3/26

OTHER PUBLICATIONS

"Save-A-Deer Whistle" webpage, http://deerwhistle.com, Oct. 19, 2010, 9 pages, retrieved using the Internet Archive Wayback Machine on Jan. 17, 2014.*
"Save-A-Deer Whistle" webpage, http://deerwhistle.com, Feb. 4, 2009, 7 pages, retrieved using the Internet Archive Wayback Machine on Jan. 17, 2014.*

* cited by examiner

*Primary Examiner* — R. A. Smith
(74) *Attorney, Agent, or Firm* — Craig W. Barber; Barber Legal

(57) ABSTRACT

A deer whistle for vehicular safety is provided which is more reliable than known deer whistles. A single body had therethrough two whistle cavities, and the manufacture of the whistle is done in a manner, and using structures, which provide for accurate sound production. In particular, the device uses a raised weld between the whistle portions, alignment posts and recesses to further increase the accuracy of manufacture, and finally uses a specified combination of heat and pressure in whistle manufacture for the weld.

6 Claims, 2 Drawing Sheets

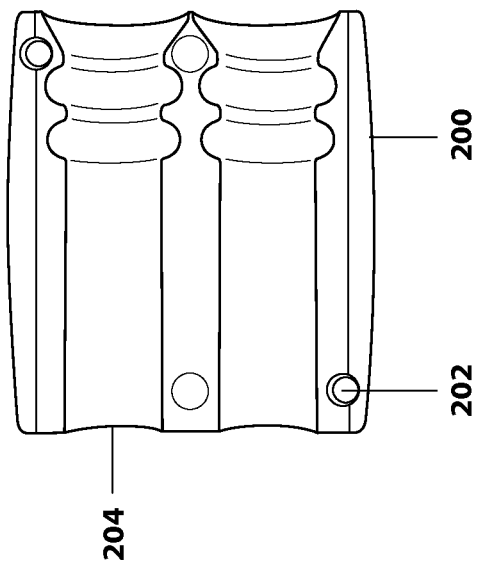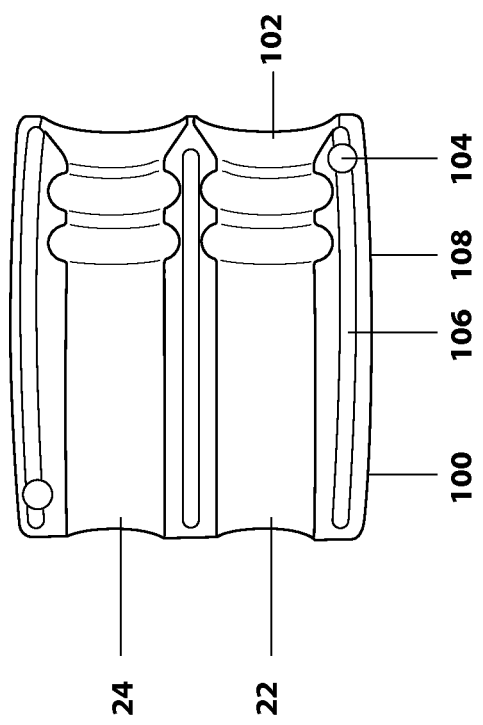

RELIABLE DEER WHISTLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

N/A

FIELD OF THE INVENTION

This invention relates generally to automotive/vehicular deer whistle devices, and specifically to two-tone molded vehicular deer whistles.

STATEMENT REGARDING FEDERALLY FUNDED RESEARCH

This invention was not made under contract with an agency of the US Government, nor by any agency of the US Government. Production testing discussed herein was carried out at applicant's behest and expense.

BACKGROUND OF THE INVENTION

Vehicle/deer collisions ("DVC") are a quite serious danger to drivers (and animals), comprising as much as 4% of all US vehicular collisions and causing many fatalities yearly. In certain parts of the country, such as rural areas (and increasingly in suburban areas as well) the frequency of such collisions has increased markedly in the modern era. This might be due to the combination of effective environmental protection and the absence of effective predation (as most natural predators are now absent while human hunting takes a very small percentage of deer populations).

For those living in urban areas, this may sound trivial, however a few numbers may help explain the seriousness of this.

In 2010 in the state of Michigan alone, there were 55,867 reported accidents between vehicles and deer. The average insurance claim for deer vehicle damage ran $2,100 US. More importantly 11 people died in these DVC accidents in this one state alone.

In the USA alone, 247,000 deer/vehicle collisions occurred in 2010, resulting in over one BILLION dollars (US) in damage, and over 200 human fatalities. The high death toll may be partially due to the fact that a deer's center of mass is quite high off of the ground and the body does not behave the same as a human body does when hit by a vehicle at high speed. In a collision, the animal's legs are quickly broken, leaving the mauled 200+ pound carcass to roll across the hood of the vehicle and smash through the windshield into the passengers. Outcomes are obviously even worse if the animal is caught in the act of leaping or if the vehicle is a motorcycle.

Several billion more US dollars are spent every year in an effort to reduce these accidents. (Common measures include signage, fencing, and so on). Yet the result is a huge and ongoing toll of death and destruction from a type of accident so mundane and ordinary that it rarely gets any serious attention.

All of these statistics are for the United States only, but in fact the same problem occurs and the same sorts of measures are taken, virtually world-wide, on continents including at least South America, Asia and Europe. For example, the White-Tailed Deer alone ranges from Canada through the US (from the Rockies eastward), through Mexico, Central America and across most of South America, and this is merely a single species of the many species of deer worldwide.

Drivers, fleet operators and insurance companies can take vehicle based measures to attempt to prevent DVCs.

A vehicular safety deer whistle is a small air driven whistle installed on the exterior of a vehicle in a location and orientation such that when the vehicle is in motion (often at a speed above some minimum required in order to drive the whistle) a shrill noise is produced at a frequency not audible to human beings but clearly audible to deer. In general, the whistle is mounted on the exterior of the vehicle, so the air passing over the vehicle drives the whistle. Some air enters the mouth of the whistle bore or whistle cavity. Inside of the bore, the air is partially split into two streams, one of which passes through cleanly while the other stream swirls in accordance with the shape of the whistle cavity, "packing" and "unpacking" inside the cavity over and over again. Since an extremely high pitch (high frequency, thousands of hertz in this case) is desired for a deer whistle, extremely rapid packing and unpacking is desirable and so small cavities/bores and small divisions of the air stream are also desirable. In point of fact, the interior of the applicant's product bears a passing resemblance to the interior of an organ pipe, however, huge organ pipes are used to produce the low tones used in organ music while the present invention uses a tiny "organ pipe" in attaining sounds too highly pitched for human hearing. Both simply resonate at a frequency determined by size and geometry.

While the theory of the deer whistle is sound, the results of independent testing have been mixed. In some cases the whistles are found to perform well, while in other cases no useful effect is found.

An example of one of the few independent tests to prove the utility and efficiency of deer whistles is that testing carried out by the Modoc County, Calif., Road Department and Public Works Department.

In that test 1,648 vehicles were equipped with one of three different types of deer whistle (including the precursor to the present invention) and driven for an extended period of time. A control group of vehicles were tracked but did not receive deer whistles. During the testing time frame, the control group had numerous DVC accidents, while for the whistle equipped group of vehicles the expected number of DVCs would have been 5.7, however in fact there were zero DVC in the whistle equipped group, leading the study authors to conclude with 99.3% certainty (chi-squared of 7.2) that the deer whistles worked. The three types of deer whistles used included an electronic whistle as well.

The authors compared costs of the study program versus damage costs for 5.7 accidents and found the cost benefit ratio of deer whistles to be a favorable 2.7 to 1 in the study, indicating deer whistles to be an economically beneficial item.

However, this study is for several types of deer whistles, not a comparison between types. A more pointed study was carried out by the Business Research Group, which mounted deer whistles on vehicles in four counties in three different states and observed and quantified the reactions of visible deer to the whistle equipped vehicles, breaking the results down by type of whistle. Two types of whistles were tested, valve-type and flow-through type, four models of valve-type and five models of flow-through. The precursor of the present invention as used in the test was also a double-bore flow through whistle.

These results were fairly shocking Valve-type deer whistles were not found effective enough at moving deer to allow any measurement and quantification. Valve-type deer whistles will not be further discussed in this patent application.

Among types of flow-through whistles (the present invention is obviously a flow-through design), three models scored between 70% and 40% effectiveness at inducing a useful response from deer, that is, at causing the deer to move away at the proper time. Only two models of whistle (the precursor to the present invention being one of these two) were able to attain an effectiveness above 90%.

(These test results and supporting data may be found at the following website address: http://www.deerwhistle.com/html/research comments.html, and for this application were accessed on Dec. 27, 2011. The various tests have various authors and were undertaken by the organizations (Modoc County and Business Research Group) identified previously.)

Clearly, deer whistles vary enormously in effectiveness, not just based upon type but also based upon other factors which might be harder to quantify.

One possible solution to this problem is of course to provide more than a single whistle bore through the whistle. Indeed, common types of whistles are sold in pairs, possibly so as to provide a higher degree of reliability. The precursor to the present invention and the "Screaming Hawk" brand of whistle both take this a step further by providing two bores in a single whistle housing.

One explanation for the lack of testing success found in brands other than that of the applicant may be the issue of production quality. In general, most deer whistles of competing companies tend to be cheaply produced and of irregular quality. However, the production of sound is sensitive to extremely small variations in the geometry of the whistle, so slight manufacturing irregularities can result in deer whistles which appear to the naked eye to be identical to other, working, deer whistles, but which do not produce noise, or produce weak noise, produce noise only under a few limited conditions of speed, and so on and so forth. Even a few thousandths of an inch in difference can render a whistle mute, and most cheaply constructed deer whistles can easily exceed these tolerances.

As will be discussed below, the applicant had production level testing done to determine how manufacturing might be conducted to create reliable deer whistles.

SUMMARY OF THE INVENTION

General Summary

It is therefore one aspect, advantage, objective and embodiment of the invention to provide deer whistles having reliable acoustic properties by means of tightly controlled manufacturing processes and the use of physical features on the deer whistle components which allow excellent manufacturing standards to be maintained.

In the present case, the applicant had production testing carried out to determine the characteristics of a deer whistle which provide the most accurate and reliable sound production by the finished whistle. A testing program examined the variable of plastic welding time and other variables, including specifically pressure for the weld and time of the weld.

Samples were then examined to determine how many were in fact defective at different combinations of time and pressure.

SUMMARY IN REFERENCE TO CLAIMS

It is therefore a first aspect, advantage, objective and embodiment of the present invention to provide a deer whistle comprising:
a single polymer body comprising upper and lower portions,
the single polymer body having two parallel whistle bores therethrough, the two bores
having therein small irregular lips dimensioned and configured to produce a sound too highly pitched for human hearing;
a mounting part of the lower portion of the single polymer body having a flat surface;
a 0.13 second plastic weld uniting the upper and lower portions into the single polymer body.

It is therefore a second aspect, advantage, objective and embodiment of the present invention to provide a deer whistle further comprising:
a single polymer body comprising upper and lower portions, the upper and lower portions each having a mating face thereon, the mating faces being identical so that the upper and lower portions may fit together exactly,
the single polymer body having two parallel whistle bores therethrough, the two bores having therein small irregular lips dimensioned and configured to produce a sound too highly pitched for human hearing;
a mounting part of the lower portion of the single polymer body having a flat surface;
a plastic weld in the range from 12 psi to 15 psi uniting the upper and lower portions into the single polymer body.

It is therefore another aspect, advantage, objective and embodiment of the present invention to provide a deer whistle further comprising:
a plurality of alignment posts on at least one of the mating faces, and a plurality of matching alignment recesses, whereby the upper and lower portions when joined are aligned.

It is therefore another aspect, advantage, objective and embodiment of the present invention to provide a deer whistle wherein the plastic weld further comprising:
a plurality of raised ridges on at least one of the mating faces.

It is therefore another aspect, advantage, objective and embodiment of the present invention to provide a method of manufacturing a deer whistle, the method comprising the steps of:
a. injection molding of polymer material an upper portion and a lower portion, the upper and lower portions each having a mating face thereon, the mating faces being identical so that the upper and lower portions may fit together exactly, the upper and lower portions dimensioned and configured so that when fit together they form a single body having two parallel whistle bores therethrough, the two bores having therein small irregular lips dimensioned and configured to produce a sound too highly pitched for human hearing;
b. welding together the upper and lower portions at the mating faces, at a time in the range from 0.08 seconds to 0.15 seconds,
c. holding together the upper and lower portions of the mating faces for a hold time of 0.10 seconds.

It is therefore another aspect, advantage, objective and embodiment of the present invention to provide a method of manufacturing a deer whistle, the method further wherein:

welding together the upper and lower portions further comprises using a pressure of 15 psi.

It is therefore another aspect, advantage, objective and embodiment of the present invention to provide a method of manufacturing a deer whistle, the method further wherein:

The weld further comprises a plurality of raised ridges on at least one of the mating faces.

It is therefore another aspect, advantage, objective and embodiment of the present invention to provide a method of manufacturing a deer whistle, the method further wherein the mating faces further comprise a plurality of alignment posts on at least one of the mating faces, and a plurality of matching alignment recesses, whereby the upper and lower portions when joined are aligned.

BRIEF DESCRIPTION OF THE DRAWINGS

FIG. 8 is a cross-sectional view of the lower portion of the first embodiment of the invention, showing details of the weld, alignment pins, the mating face, the whistle bores and so on.

FIG. 9 is a cross-sectional view of the upper portions of the first embodiment of the invention, showing details of the alignment recesses.

DETAILED DESCRIPTION

Index to Reference Numerals

Figure 3:
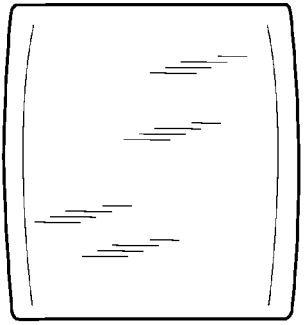
FIG. 3 is a top view of the first embodiment of the invention.

10 Single polymer body
22 Whistle cavity/bore
24 Whistle cavity/bore
60 Mounting part/foot
100 Lower portion
102 Acoustic lip/toroid-shaped depression
104 Alignment post
106 Weld
108 Mating face
200 Upper portion
202 Alignment recesses
204 Mating face In the presently preferred embodiment and best mode presently contemplated for carrying out the invention, a superior decorative and utilitarian appearance is achieved by combining two whistle cavities into a single polymer body.

Figure 1:
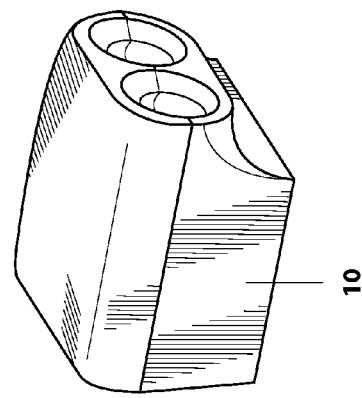
FIG. 1 is a perspective view of the first embodiment of the invention, showing the single body and the two bores passing therethrough.

FIG. 1 is a perspective view of the first embodiment of the invention, showing the single body 10 and the two bores passing therethrough. In the presently preferred embodiment, the body 10 is made of polymer material having desirable properties of toughness and esthetic appeal.

In use, the body 10 is attached to the exterior of the vehicle at the base and is oriented so that the direction of airflow is directly through the two parallel whistle bores. This is a "flow-through" type deer whistle.

Figure 2:
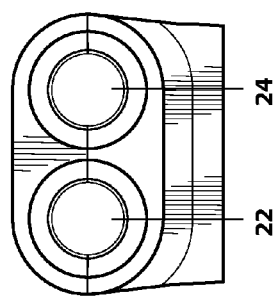
FIG. 2 is a front view of the first embodiment of the invention, showing the mouths of the two resonant cavities.

FIG. 2 is a front view of the first embodiment of the invention, showing the mouths of the two resonant cavities/whistle bores 22 and 24.

FIG. 3 is a top view of the first embodiment of the invention.

Figure 5:
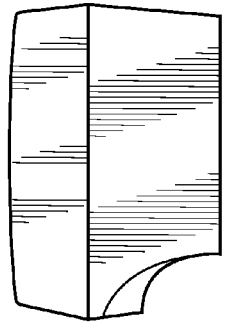
FIG. 5 is a left side view of the first embodiment of the invention.
Figure 4:
FIG. 4 is a right side view of the first embodiment of the invention.

FIG. 4 is a right side view of the first embodiment of the invention, while FIG. 5 is a left side view of the first embodiment of the invention. In these figures the hairline between the upper and lower portions is clearly visible, it may also be seen in FIG. 1 and FIG. 2.

Figure 6:
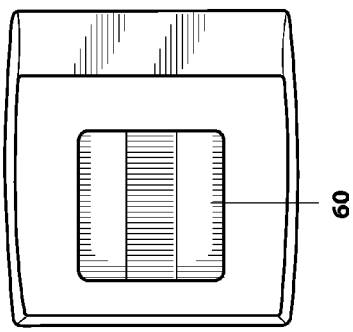
FIG. 6 is a bottom view of the first embodiment of the invention, showing the mounting foot on the lower portion of the device.

FIG. 6 is a bottom view of the first embodiment of the invention, showing the mounting foot 60 on the lower portion of the device. In use, the mounting foot is provided with an adhesive, or an aperture for a bolt, or other fasteners.

Figure 7:
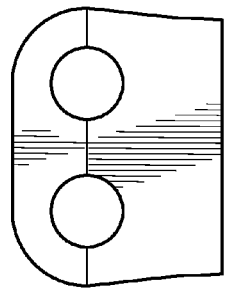
FIG. 7 is a rear view of the first embodiment of the invention, showing that the whistle cavities/whistle bores pass right through the device from front to back.

FIG. 7 is a rear view of the first embodiment of the invention, showing that the whistle cavities/whistle bores pass right through the device from front to back.

A production testing program examined the variable of plastic welding time and other variables, such as pressure. The testing program tested a selection of welding times ranging from 0.05 second with little or no hold time up to a maximum of 0.25 second (¼ second), and further tested hold times, that is, the time during which the weld can cool while the deer whistle is held in place.

In addition, various pressures for the ultrasonic weld were also tested. These pressures ranged from 12 psi up to 30 psi (pounds per square inch). The various pressures and times were also tested in certain combinations.

The goal of the testing program was to produce deer whistles with a reliable sound production capability. It is known that defective welding of the pieces of the whistle is a source of sound production problems, as the air can flow incorrectly by passing in or out of the whistle and thus avoiding the repetitive "packing" and "unpacking" which are necessary to produce the whistle: this is analogous to the way a worn pad on a saxophone will allow air to flow in or out of the horn of the instrument and thus harm sound production. In practice, it has been found that if the whistle bore is not packing and unpacking properly, no useful sound is produced at all. Thus, the samples from the testing program were inspected and declared either "good" or "bad" based upon the presence or absences of gaps between the two pieces of the whistle.

Example testing data includes welding the two pieces at 25 psi for 0.05 seconds, producing 23 whistles, of which only 17 were good while no less than 5 out of 23 were visibly bad, with gaps and the like. On the other hand, whistles welded at 0.08 seconds time and 20 psi had a perfect test score, that is, all were declared good.

In the end, an optimum combination of 15 psi, 0.13 second weld time, and an additional hold time of 0.10 seconds were settled upon, when used in conjunction with structural features discussed later. The determination of best two-bore ultrasonic welding conditions were not the only results of the program. Based upon this testing, a number of production changes were made, but in addition a number of structural changes were made as well. Both types of changes were made to provide an exact fit between the mating faces of the device. The term "exact fit" in this context refers to proper alignment of the upper and lower portions to one another, within a tolerance such that production units will all exhibit proper acoustical behavior and will correctly and reliably produce sound. Thus a time of 0.13 seconds and 15 psi, with a 0.10 second hold time was found to provide for a welding process which produces an exact fit according to this definition.

Structural changes to the deer whistle design will now be discussed in reference to the following diagrams.

FIG. 8 is a cross-sectional view of the lower portion of the first embodiment of the invention, showing details of the weld, alignment pins, the mating face, the whistle bores and so on. FIG. 9 is a cross-sectional view of the upper portions of the first embodiment of the invention, showing details of the alignment recesses.

The major feature of the lower portion mating face is the two semi-cylindrical channels which comprise the lower half of the whistle bores. Within the whistle bores 22 and 24 there may be found a plurality of toroidal ("doughnut shaped") places defined by lips such as lip 102. These wider places and the lips which define them cause air passing through the bores 22/24 to resonate at a frequency determined by well-known equations, in accordance with the Bernoulli effect. (The Bernoulli effect related to acoustics, obviously, not the other Bernoulli principles).

The improvements relating to production quality and reliable sound are actually found on the mating face(s), in this diagram face 108. Face 108 itself is a flat surface which is interrupted and divided into three parts by the two whistle bores. Face 108 is the same size and shape (dimension and configuration), but in mirror image, as face 204 (FIG. 9). Face 108 has thereon several features, aspects and advantages which assist the improved welding process in production of accurate sound.

Alignment posts 104 protrude above face 108 and are dimensioned and configured to physically engage to alignment recesses 204 (FIG. 9). By providing these matching posts and recesses (shown at opposite corners of the device mating faces but which may be in a number of configurations within the scope of the invention and claims) the exact join of the lower and upper portion into a whistle is provided.

Weld 106 is another protrusion above the otherwise flat surface of face 108. Weld 106 (there are three provided, one for each portion of the divided face 108) is provided so that welding material is present to melt quickly and accurately into place and join the faces of the device together properly. When welded together at the proper pressure and time, weld 106 melts, then when pressed to the matching face 204, cools, joining the upper and lower portions into a single body.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A deer whistle comprising:
  a single polymer body comprising upper and lower portions,
  the single polymer body having two parallel whistle bores therethrough, the two bores having therein small irregular lips dimensioned and configured to produce a sound too highly pitched for human hearing;
  a mounting part of the lower portion of the single polymer body having a flat surface;
  a raised weld on one of the upper and lower portions;
  a 0.13 second plastic welding operation applied to the raised weld, thus uniting the upper and lower portions into the single polymer body.

2. A deer whistle comprising:
  a single polymer body comprising upper and lower portions, the upper and lower portions each having a mating face thereon, the mating faces being identical so that the upper and lower portions may fit together exactly,
  the single polymer body having two parallel whistle bores therethrough, the two bores having therein small irregular lips dimensioned and configured to produce a sound too highly pitched for human hearing;
  a mounting part of the lower portion of the single polymer body having a flat surface;
  a raised weld on the mating face of one of the upper and lower portion, the raised weld meeting the mating face of the other portion;
  a plastic welding operation in the range from 12 psi to 15 psi applied to the raised weld, thus uniting the upper and lower portions into the single polymer body.

3. The deer whistle of claim 2, further comprising:
  A plurality of alignment posts on at least one of the mating faces, and a plurality of matching alignment recesses, whereby the upper and lower portions when joined are aligned.

4. A method of manufacturing a deer whistle, the method comprising the steps of:
  a. injection molding of polymer material an upper portion and a lower portion, the upper and lower portions each having a mating face thereon, the mating faces being identical so that the upper and lower portions may fit together exactly, a raised weld on one of the upper and lower portions' mating faces, the upper and lower portions dimensioned and configured so that when fit together they form a single body having two parallel whistle bores therethrough, the two bores having therein small irregular lips dimensioned and configured to produce a sound too highly pitched for human hearing;
  b. welding together the upper and lower portions at the mating faces, applying the welding operation to the raised weld at a time in the range from 0.08 seconds to 0.15 seconds,
  c. holding together the upper and lower portions of the mating faces for a hold time of 0.10 seconds.

5. The method of manufacturing a deer whistle of claim 4, wherein:
  welding together the upper and lower portions further comprises using a pressure of 15 psi.

6. The method of manufacturing a deer whistle of claim 4, wherein:
  The mating faces further comprise a plurality of alignment posts on at least one of the mating faces, and a plurality of matching alignment recesses, whereby the upper and lower portions when joined are aligned.

* * * * *